(12) United States Patent
Varesano

(10) Patent No.: US 10,681,876 B2
(45) Date of Patent: Jun. 16, 2020

(54) ABOVE-GROUND FARMING MODULE IN WHICH THE ROOTS OF THE PLANTS ARE FED BY A NUTRITIONAL MIST, SET OF MODULES AND ASSOCIATED METHOD

(71) Applicant: Gérard Varesano, Sète (FR)

(72) Inventor: Gérard Varesano, Sète (FR)

( * ) Notice: Subject to any disclaimer, the term of this patent is extended or adjusted under 35 U.S.C. 154(b) by 245 days.

(21) Appl. No.: 15/540,728

(22) PCT Filed: Dec. 30, 2015

(86) PCT No.: PCT/FR2015/053773
§ 371 (c)(1),
(2) Date: Jun. 29, 2017

(87) PCT Pub. No.: WO2016/108031
PCT Pub. Date: Jul. 7, 2016

(65) Prior Publication Data
US 2017/0347546 A1   Dec. 7, 2017

(30) Foreign Application Priority Data

Dec. 31, 2014 (FR) .................................... 14 03054

(51) Int. Cl.
*A01G 31/02* (2006.01)
*B05B 1/26* (2006.01)
(Continued)

(52) U.S. Cl.
CPC ............. *A01G 31/02* (2013.01); *A01G 29/00* (2013.01); *B05B 1/265* (2013.01); *B05B 5/032* (2013.01);
(Continued)

(58) Field of Classification Search
CPC ..... A01G 31/02; A01G 2031/006; A01G 9/02; A01G 29/00; Y02P 60/216; B05B 5/1691; B05B 5/032; B05B 1/265
See application file for complete search history.

(56) References Cited

U.S. PATENT DOCUMENTS 4,332,105 A * 6/1982 Nir .................... A01G 31/02
137/563
5,136,804 A * 8/1992 Rothem ............. A01G 31/02
47/59 R
(Continued)

FOREIGN PATENT DOCUMENTS

JP   2003-116379 A   4/2003
JP   2010-259389 A   11/2010
(Continued)

OTHER PUBLICATIONS

International Search Report and Written Opinion dated Jun. 3, 2016 issued in corresponding application No. PCT/FR2015/053773; w/ English partial translation and partial machine translation (20 pages).

*Primary Examiner* — Joshua D Huson
(74) *Attorney, Agent, or Firm* — Seckel IP, PLLC

(57) ABSTRACT

The invention relates mainly to an above-ground farming module which includes an element for supporting plants defining a root chamber for the aerial portion of the plants, and which includes means for forming a mist of nutritional solution (9) and means (25, 26) for circulating said mist of nutritional solution (30) located in the root chamber (4). The means for forming the mist of nutritional solution (9) advantageously include an ultrasound mister (10) located in the bottom of a misting cell (9) on which at least one opening for propagating the nutritional mist (20) in the root chamber (4) is arranged, and the means (25, 26) for circulating the mist of nutritional solution (30) are located next to said opening (20).

21 Claims, 1 Drawing Sheet

Figure 1:
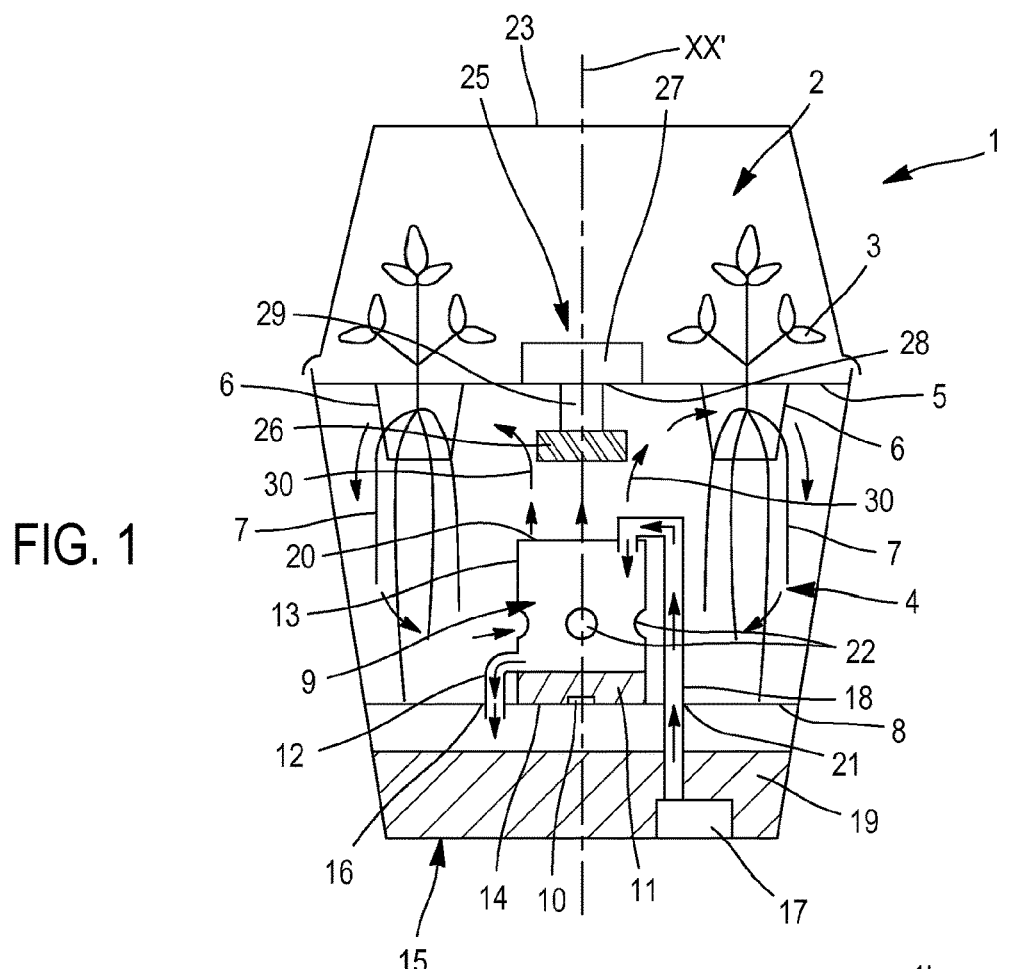

(51) Int. Cl.
*B05B 5/03* (2006.01)
*A01G 9/02* (2018.01)
*B05B 5/16* (2006.01)
*A01G 29/00* (2006.01)
*A01G 31/00* (2018.01)

(52) U.S. Cl.
CPC .......... *A01G 9/02* (2013.01); *A01G 2031/006* (2013.01); *B05B 5/1691* (2013.01); *Y02P 60/216* (2015.11)

(56) References Cited

U.S. PATENT DOCUMENTS

| | | | | |
|---|---|---|---|---|
| 5,393,426 A * | 2/1995 | Raskin | ...................... | C02F 3/327 |
| | | | | 210/602 |
| 5,887,383 A * | 3/1999 | Soeda | ...................... | A01G 31/02 |
| | | | | 47/59 R |
| 5,937,575 A * | 8/1999 | Zobel | ...................... | A01G 31/02 |
| | | | | 250/339.13 |
| 7,748,164 B2 * | 7/2010 | Hirafuji | .................. | A01K 1/031 |
| | | | | 47/60 |
| 8,250,809 B2 * | 8/2012 | Simmons | ............... | A01G 31/02 |
| | | | | 47/62 N |
| 8,516,742 B1 * | 8/2013 | Azoulay | ................. | A01G 31/02 |
| | | | | 47/62 A |
| 9,357,715 B2 * | 6/2016 | Cottrell | ................... | A01G 22/00 |
| 2005/0246955 A1 * | 11/2005 | Bissonnette | ............. | A01C 1/02 |
| | | | | 47/62 A |
| 2009/0293357 A1 * | 12/2009 | Vickers | ................... | A01G 31/02 |
| | | | | 47/62 A |
| 2011/0061297 A1 * | 3/2011 | Simmons | ............... | A01G 31/02 |
| | | | | 47/62 A |
| 2015/0313104 A1 * | 11/2015 | Cottrell | ................... | A01G 22/00 |
| | | | | 47/62 A |

FOREIGN PATENT DOCUMENTS

| | | | |
|---|---|---|---|
| KR | 19990064904 A * | 8/1999 | |
| KR | 10-1477087 B1 | 12/2014 | |
| WO | 2013/136459 A1 | 9/2013 | |

\* cited by examiner

ABOVE-GROUND FARMING MODULE IN WHICH THE ROOTS OF THE PLANTS ARE FED BY A NUTRITIONAL MIST, SET OF MODULES AND ASSOCIATED METHOD

The invention relates mainly to an improved above-ground farming module which includes means for forming a nutritional mist.

The invention also relates to a set of modules and an associated feeding method by a nutritional mist.

Above-ground plant farming is conducted on a substrate in which the roots of the plants lie and are fed continuously or periodically by a nutritional solution.

Hydroponic farming is known to irrigate the neutral and inert substrate of a nutritional solution including mineral salts, nutrients and any other element contributing to plant growth.

This type of above-ground farming has been increasingly replaced by aeroponic farming which applies techniques of vaporization of nutritional solutions of the substrate in a closed circuit. This technique has the advantage of feeding the substrate both with nutritional elements and in air, and of limiting the use of water while controlling the parameters of the nutritional environment, particularly by limiting the introduction of harmful elements in the nutritional solution.

A new technique declined from aeroponic farming has recently been developed. It consists of ultraponic farming in which the vaporization of the nutritional solution is conducted by an ultrasound mister forming very thin droplets of nutritional solution of less than 5 microns. The plants are placed in stands positioned on an element of support defining a root chamber in which the mist of nutritional solution of the aerial portion of the plants is produced.

While this technique contributes to the faster growth of most plants and fungi compared to that of aeroponic farming, its results for other plants remain limited.

The invention falls into above-ground farming by vaporization and more particularly ultraponic above-ground farming.

This invention focuses on an above-ground farming module in which the roots of the plants are fed by a mist of nutritional solution, with an increased efficiency on the growth of plants compared to existing above-ground farming methods.

For this purpose, the above-ground farming module of the invention includes an element for supporting plants delimiting a root chamber from the aerial portion of the plants, which is essentially characterized in that it includes means for forming a mist of nutritional solution and means for circulating the said mist of nutritional solution located in the root chamber.

The above-ground farming module of the invention may also include the following so optional characteristics considered individually or according to all possible combinations of techniques:

Means for forming the mist of nutritional solution include an ultrasound mister located in the bottom of the misting cell which is fed by a liquid nutritional solution and on which at least one opening for propagating the mist of nutritional solution in the root chamber is arranged, and the means for circulating the mist of nutritional solution are located next to said opening.

The misting cell is cylindrical, extending from the bottom of the root chamber up to an open upper neck forming an opening for propagation the nutritional mist arranged opposite to and in the proximity of the means for circulating the mist of nutritional solution, and includes air circulation openings arranged on its lateral walls ensuring the circulation of air in the misting cell.

The propeller of a fan forming the means for circulating the mist of nutritional solutions is arranged opposite to and in the proximity of the open upper neck of the cylindrical misting cell, the said propeller is spaced apart from its actuation motor; the actuation motor being located on a side of the aerial portion of the plants.

The aerial portion of the plants is confined to a removable watertight bell.

The misting cell is fed by a nutritional solution from a liquid nutritional solution reserve linked to the said misting cell by at least one circulation duct of the nutritional solution in which the nutritional solution is sent via a pump located in the said reserve, and a draining duct extends from the lateral wall of the said misting cell up to a draining tray for the overflow ensuring the draining of the overflow of nutritional solution of the said misting cell.

The reserve of nutritional solution is arranged under and in the continuation of the root chamber forming also a draining tray for the overflow of the misting cell and separated from the root chamber by a wall comprising watertight openings for the circulation duct of the nutritional conduct towards the misting cell and for the draining duct of the nutritional solutions of the misting cell respectively.

The draining tray for the overflow of the misting cell is linked to the reserve of the nutritional solution via a connecting duct in which the overflow of solution is sent in circulation through a pump located in the said draining tray.

The invention also relates to a set of modules of above-ground farming which is essentially characterized in that it includes at least two modules such as the above-mentioned which include a draining tray for the overflow of the misting cell linked to the reserve of the nutritional solution by a connecting duct, and a common reserve of a nutritional solution which feeds the misting cells of the at least two respective modules.

Finally, the invention relates to a method for propagating a mist of nutritional solution in a root chamber of above-ground farming which is characterized in that it allows for the use of at least one module or a set of modules such as those above-mentioned, and by the duration and rhythm of the active periods for forming the mist of nutritional solution in the root chamber.

Figure 2:
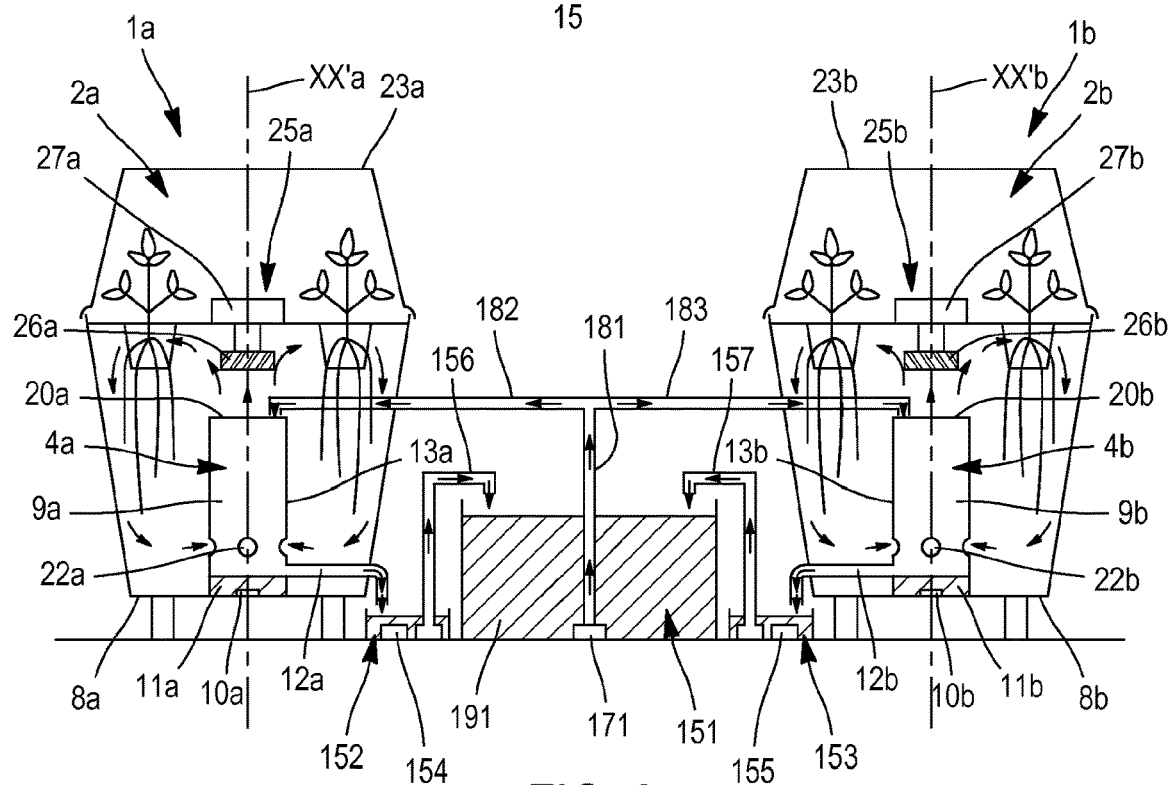

Other characteristics and advantages of the invention will be apparent in the below descriptions, by way of indication and in no way limiting, and referring to the annexed figures among which:

FIG. 1 is an axial schematic representation of an above-ground farming module of the invention in accordance to a first variant, and FIG. 2 is an axial schematic representation of a set of above-ground farming modules in accordance to a second variant.

Referring to FIG. 1, the above-ground farming module of the invention 1 extends along a main axis XX' and includes an aerial portion 2 of the plants 3 and a root chamber 4 which are delimited, in a watertight manner, by an element of support 5 of substrate pots 6 receiving the roots 7 of the plants 3 with extend down into the root chamber 4 through non-represented openings arranged in the substrate pots 6.

A misting cell 9 stands, in a watertight manner, at the bottom 8 of the root chamber 4, presenting a cylindrical configuration centered on the main axis XX' of a dimeter of 14 centimeters extending from the top of root chamber 4 with a height adapted to the height of the root chamber 4.

An ultrasound mister 10 stands in the bottom of mist cell 9 and has been pre-coated with a hydrophobic resin excluding the ceramic disk which forms the mist of nutritional solution through its vibrations with adapted frequency.

The ceramic disk is coated with liquid nutritional solution 11 of which its level is controlled by a draining duct 12 extending from the lateral wall 13 of the misting cell 9 from 5 centimeters of the bottom 14 of the misting cell 9 to a reserve of nutritional solution 15 located under and in the continuation of the root chamber 4 and which concurrently forms a draining tray for the overflow of the misting cell 9. For this purpose, a watertight opening 16 for the draining duct 12 is arranged at the bottom wall 8 of the root chamber 4. The draining duct 12 prevents the use of cumbersome buoys known for maintaining the ultrasound mister at a good distance from the surface of the liquid.

The misting cell 9 is fed by a liquid nutritional solution from the nutritional solution reserve 15 via a pump 17 and a circulation duct 18 of nutritional solution 19 extending from the open upper neck of the misting cell 9 forming an opening for propagating the nutritional mist in the root chamber 4. For this purpose, a watertight hole 21 for the draining duct is arranged in the bottom wall 8 of the root chamber 4.

At approximately 12 centimeters from the bottom 14 of the misting cell 9, a series of air circulation openings 22 are arranged on the perimeter of the lateral walls 13 of the misting cell 9 to ensure the circulation of air in the said cell 9.

As represented in FIG. 1, a removable plastic bell 23 covers the aerial portion of the plants 2. It is possible to allow for the use of a heating drawstring to control the temperature within the aerial portion of the plants 2 therefore forming a hothouse for the germination and cutting, as well as circumventing delicate transplantations.

According to the invention, a fan 25 is placed at the level of the element of support 5 of the substrate pots 6 facing coaxially the open upper neck 20 of the misting cell 9. More specifically, the propeller 26 of the fan 25 is located next to the open upper neck 20 of the misting cell 9 and is spaced apart, relative to the main axis XX', from the driving motor 27 of the propeller 26 which is located on the element of support 5 of the substrate pots 6 on the side of the aerial portion of the plants 2. For this purpose, a watertight opening 28 is arranged in the element of support 5 of the substrate pots 6 to link the axis 29 linking the motor 27 to the propeller 26 of the fan 25.

The propeller 26 of the fan 25 located next to the open upper neck 20 of the misting cell ensures the circulating of the mist of nutritional solution 30 formed by the misting cell 9 in the whole root chamber 4 while providing to the roots 7 a maximum intake of oxygen superior to all existing above-ground farming methods. The functioning of the propeller 26, which moves the mist of nutritional solution 30 without having exterior air entering the root chamber 4, creates a depression allowing to confine the nutritional mist 30 in circulation in the said root chamber 4.

To ensure the circulating of the mist of nutritional solution 30 to efficiently take place, the means for circulating the mist of nutritional solution formed in this particular mode, by the propeller 26 spaced apart from its driving motor 27, must be situated in the root chamber and preferably near the opening for the propagating of the nutritional mist 20 formed in the misting cell 9 which is also located in the root chamber 4.

Referring to FIG. 2, a set of modules according to the invention includes two modules 1a,1b identical to module 1 of FIG. 1 as for each a misting cell 9a,9b extends from the respective main axis XX'a,XX'b of the specific module 1a,1b and located in the back 8a,8b of the root chamber 4a,4b.

The misting cell 9a,9b includes air circulation openings 22a,22b and an open upper neck 20a,20b forming an opening for the propagating of nutritional mist opposite to which is set coaxially the propeller 26a,26b of the fan 25a,25b, with its motor 25a,25b off-centered from the main axis XX'a,XX'b and located next to the aerial portion of the plants 2a,2b.

In this variant and unlike module 1 of FIG. 1, the reserve of nutritional solution 151 is common to both modules 2a,2b, and each misting cell 9a,9b is linked to a overflow draining tray 152,153 separate from the common reserve of nutritional solution 151.

More precisely, a pump 171 located in the common reserve of nutritional solution 151 ensures the circulation of the liquid nutritional solution 191 through a common circulation duct 181 divided into two ducts of circulation 182,183 carrying the nutritional solution up to the respective open upper necks 20a,20b of the misting cells 9a,9b of each module 1a,1b.

Each misting cell 9a,9b include a draining duct 12a,12b for the overflow of nutritional solution 11a,11b coating the associated ultrasound mister 10a,10b, extending, as for module 1 of FIG. 1, from the lateral wall 13a,13b of the specific misting cell 9a,9b, up to the draining tray of the associated overflow 152,153, and capable to reinject the nutritional solution from the overflow of the common reserve of nutritional solution 151 via a pump 154,155 and a connecting duct 156,147. As such, the overflow of nutritional solution of the misting cells 9a,9b of each module 1a,1b is reintroduced in the nutritional solution circulation circuit.

Alternatively, the module 1 of FIG. 1 may also include a deported reserve of nutritional solution such as the one in FIG. 2 as well as a draining tray for the separate overflow of the reserve of nutritional solution, owing to congestions limiting the height of module 1.

It may also be possible to allow for the presence of several misting cells in a unique farming module. This is the case when the root chamber holds a volume superior to a certain benchmark, of 90 liters for example.

Alternatively, the set of modules of FIG. 2 may include a set of three or four modules.

Finally, the duration and rhythm of the active periods for forming and circulating the mist of nutritional solution in the root chambers 4;4a,4b of the module 1;1a,1b are controlled according to the specific needs of the plants contained in the modules 1;1a,1b. It is possible, for example, to allow for a cycle for forming and circulating the solution mist of 15 minutes per hour. The duration and rhythm may evolve during the growth of the plants. Methods of control not represented but known by specialists can action the activation and the deactivation of the ultrasound misters of the misting cells.

The invention claimed is:
1. An above-ground farming module, comprising:
a support delimiting a root chamber from an aerial portion of the plants, the support extending along a main axis of the module,
means for forming a mist of nutritional solution, and
means for circulating the mist of nutritional solutions,
wherein the means for forming the mist and the means for circulating the mist are located in the root chamber, the means for forming the mist comprise an ultrasound mister located at a bottom of a misting cell centered on the main axis and fed by a liquid nutritional solution and on which is arranged at least one opening for propagating the nutritional mist from the misting cell directly into the root chamber, and the means for circulating the mist are located in the root chamber and spaced from the at least one opening outside of the misting cell and coaxially opposite to and in a proximity of the at least one opening relative to the ultrasound mister.

2. The above-ground farming module according to claim 1, wherein the misting cell is cylindrical, extending from the bottom of the root chamber up to an open upper neck forming an opening for the propagating of the nutritional mist opposite to and in the proximity of which are arranged the means for circulating the mist of nutritional solution, and wherein the misting cell includes air circulation openings arranged on lateral walls of the misting cell so as to ensure the circulation of air in the said misting cell.

3. The above-ground farming module according to claim 2, wherein a propeller of a fan forming the means for circulating the mist of nutritional solution is arranged opposite to and in the proximity of the open upper neck of the cylindrical misting cell, and wherein the propeller is spaced apart from an actuation motor of the propeller; the actuation motor being located on a side of the aerial portion of the plants.

4. The above-ground farming module according to claim 3, wherein an aerial portion of the plants is confined to a removable watertight bell.

5. The above-ground farming module according to claim 3, wherein the misting cell is fed by a nutritional solution from a reserve of liquid nutritional solution connected to the misting cell by at least one circulation duct of the nutritional solution in which the nutritional solution is sent via a pump located in the reserve, and wherein a draining duct extends from the lateral wall of the misting cell up to a draining tray for the overflow so as to ensure the draining of the overflow of nutritional solution of the misting cell.

6. The above-ground farming module according to claim 5, wherein the reserve of nutritional solution is arranged under and in the continuation of the root chamber also forming a draining tray for the overflow from the misting cell and separated from the root chamber by a wall with watertight openings for the circulation duct of the nutritional solution towards to misting cell and for the draining duct of nutritional solution from the misting cell, respectively.

7. The above-ground farming module according to claim 5, wherein the draining tray for the overflow of the misting cell is connected to the reserve of nutritional solution via a connecting duct in which the overflow of solution is sent in circulation through a pump located in the draining tray.

8. The above-ground farming module according to claim 2, wherein an aerial portion of the plants is confined to a removable watertight bell.

9. The above-ground farming module according to claim 2, wherein the misting cell is fed by a nutritional solution from a reserve of liquid nutritional solution connected to the misting cell by at least one circulation duct of the nutritional solution in which the nutritional solution is sent via a pump located in the reserve, and wherein a draining duct extends from the lateral wall of the misting cell up to a draining tray for the overflow so as to ensure the draining of the overflow of nutritional solution of the misting cell.

10. The above-ground farming module according to claim 9, wherein the reserve of nutritional solution is arranged under and in the continuation of the root chamber also forming a draining tray for the overflow from the misting cell and separated from the root chamber by a wall with watertight openings for the circulation duct of the nutritional solution towards to misting cell and for the draining duct of nutritional solution from the misting cell, respectively.

11. The above-ground farming module according to claim 9, wherein the draining tray for the overflow of the misting cell is connected to the reserve of nutritional solution via a connecting duct in which the overflow of solution is sent in circulation through a pump located in the draining tray.

12. The above-ground farming module according to claim 1, wherein an aerial portion of the plants is confined to a removable watertight bell.

13. The above-ground farming module according to claim 12, wherein the misting cell is fed by a nutritional solution from a reserve of liquid nutritional solution connected to the misting cell by at least one circulation duct of the nutritional solution in which the nutritional solution is sent via a pump located in the reserve, and wherein a draining duct extends from the lateral wall of the misting cell up to a draining tray for the overflow so as to ensure the draining of the overflow of nutritional solution of the misting cell.

14. The above-ground farming module according to claim 13, wherein the reserve of nutritional solution is arranged under and in the continuation of the root chamber also forming a draining tray for the overflow from the misting cell and separated from the root chamber by a wall with watertight openings for the circulation duct of the nutritional solution towards to misting cell and for the draining duct of nutritional solution from the misting cell, respectively.

15. The above-ground farming module according to claim 13, wherein the draining tray for the overflow of the misting cell is connected to the reserve of nutritional solution via a connecting duct in which the overflow of solution is sent in circulation through a pump located in the draining tray.

16. The above-ground farming module according to claim 1, wherein the misting cell is fed by a nutritional solution from a reserve of liquid nutritional solution connected to the misting cell by at least one circulation duct of the nutritional solution in which the nutritional solution is sent via a pump located in the reserve, and wherein a draining duct extends from the lateral wall of the misting cell up to a draining tray for the overflow so as to ensure the draining of the overflow of nutritional solution of the misting cell.

17. The above-ground farming module according to claim 16, wherein the reserve of nutritional solution is arranged under and in the continuation of the root chamber also forming a draining tray for the overflow from the misting cell and separated from the root chamber by a wall with watertight openings for the circulation duct of the nutritional solution towards to misting cell and for the draining duct of nutritional solution from the misting cell, respectively.

18. The above-ground farming module according to claim 16, wherein the draining tray for the overflow of the misting cell is connected to the reserve of nutritional solution via a connecting duct in which the overflow of solution is sent in circulation through a pump located in the draining tray.

19. A set of above-ground farming modules, comprising:
at least two modules according to claim 18, and
a common reserve of nutritional solution which feeds the respective misting cells of the at least two modules.

20. A method for propagating a mist of nutritional solution in a root providing a least one module according to claim 1, and
regulating a duration and a rhythm of active periods for the forming of the mist of nutritional solution in the root chamber.

21. The above-ground farming module according to claim 1, wherein the means for circulating the mist are located in the root chamber at a level of the support delimiting the root chamber from the aerial portion of the plants.

* * * * *